United States Patent [19]
Fann

[11] 3,814,902
[45] June 4, 1974

[54] HEAT CONTROL APPARATUS

[76] Inventor: James D. Fann, 8625 Meadowcroft, Houston, Tex. 77042

[22] Filed: May 2, 1972

[21] Appl. No.: 249,569

[52] U.S. Cl. .............................. 219/492, 219/497
[51] Int. Cl. ............................................. H05b 1/02
[58] Field of Search ........... 219/492, 494, 497, 501, 219/493; 323/5, 10

[56] References Cited
UNITED STATES PATENTS
3,062,941  11/1962  White ............................ 219/493 X
3,588,419   6/1971  Rongier ......................... 219/493 X Primary Examiner—Bernard A. Gilheany
Assistant Examiner—F. E. Bell
Attorney, Agent, or Firm—Carl B. Fox, Jr.

[57] ABSTRACT

Heat control apparatus for control of electrical input to an electric heater element to achieve linear temperature rise heating. Time-reduced voltage is applied to a temperature-sensing themocouple (or a thermistor, resistance thermometer, or the like) whereby a controller for heating element is caused to deliver current to the heating element to linearly increase the temperature of the substance being heated.

7 Claims, 1 Drawing Figure

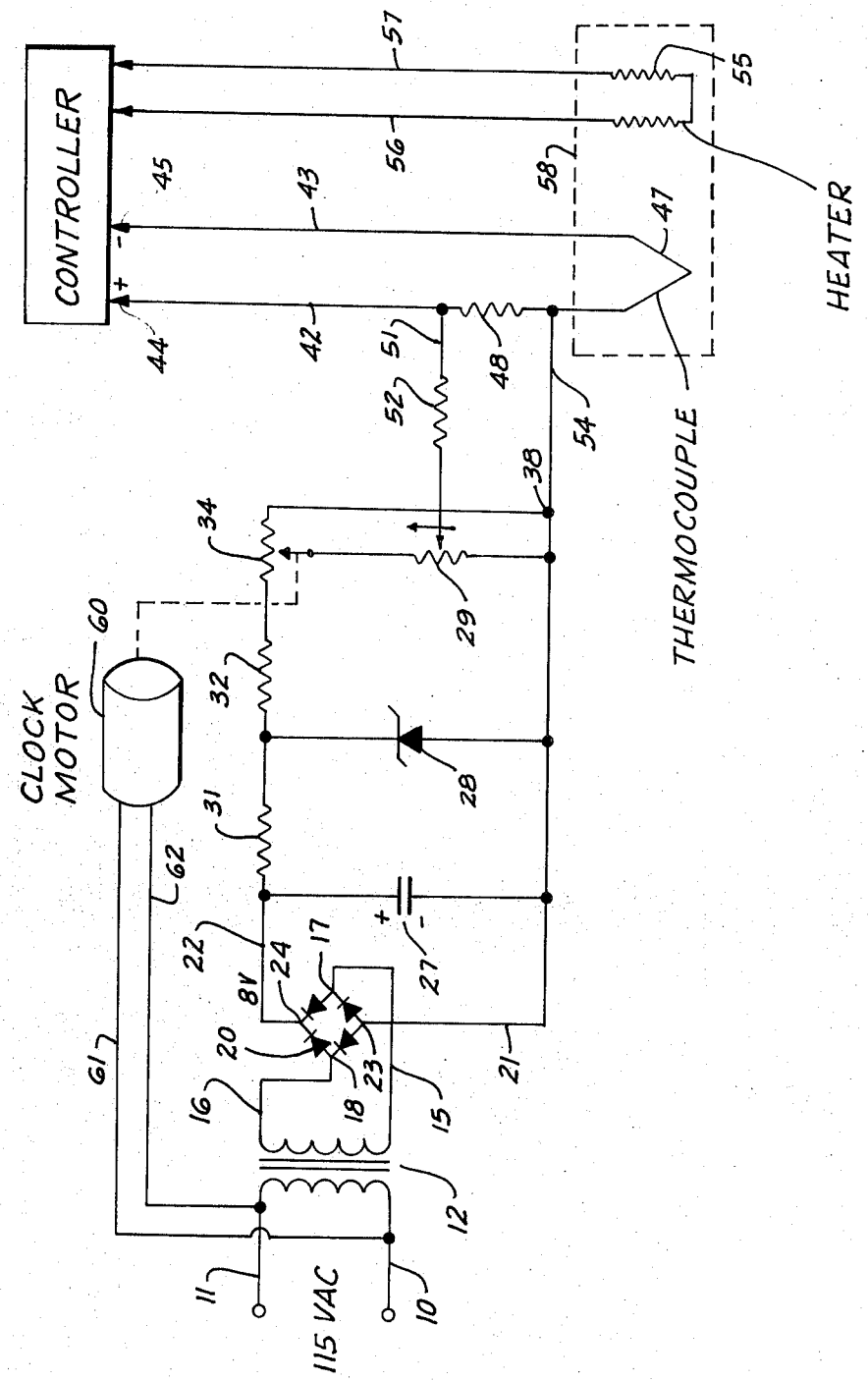

HEAT CONTROL APPARATUS

SUMMARY OF THE INVENTION

The invention pertains to an electrical heat control apparatus designed to achieve linear heating. A thermocouple senses the temperature of the heated substance or space, e.g. a liquid bath or the interior of an oven, and as the temperature of the thermocouple increases the thermocouple output voltage increases. This voltage is delivered to a controller for an electrical heating element which supplies the heat for heating the substance or space to be heated. An electrical circuit is provided which also applies voltage to the controller input so that the sum of the voltage output from the thermocouple and the external applied voltage to the controller is initially the voltage output which the thermocouple will have when the substance or space has been heated to the desired maximum temperature. The applied voltage is reduced approximately linearly timewise as heating occurs, and as the thermocouple output voltage due to heating increases. At the commencement of heating, the control voltage delivered to the controller is all usually provided by the external voltage applied to the controller input. At the end of heating, and thereafter if the substance or space is to be maintained heated, the control voltage delivered to the controller is all provided by the thermocouple itself. Between the commencement and end of heating, the applied voltage and the thermocouple voltage each supply portions of the voltage supplied to the controller, the applied voltage being decreased approximately linearly and the thermocouple voltage increasing approximately linearly as the heating period proceeds. The result is that the controller, constantly receiving control voltage corresponding to a fully heated condition in the substance or space, is "fooled into believing" that the substance or space is in fact fully heated, and applies only enough heat to maintain this condition, but as the applied voltage drops faster than the thermocouple output voltage increases, the controller must constantly control the heater to deliver heat to make up for the linearly reduced applied controller voltage, and therefore the substance or space is progressively heated linearly.

In response to the constantly linearly reduced voltage applied to the controller, the heater operates intermittently, in a cyclic manner. When the applied voltage drops sufficiently to cause the controller to apply more current to the heater, the resulting increased temperature causes the thermocouple output voltage to increase thereby causing the controller to reduce current to the heater. Then as the applied voltage continues to drop, the current to the heater is increased again and is again reduced. This cyclic operation of the heater continues throughout the heating period. After the desired maximum temperature is reached, and all voltage applied to the controller is thermocouple voltage resulting from the temperature of the heated substance or space, no applied voltage from the separate circuit being applied, the controller energizes the heater only at sufficient intervals to make up for heat losses from the substance or space, to maintain the temperature.

The control apparatus is designed to cause heating according to a linear heating curve, i.e. the temperature of the medium heated increases linearly at a predetermined rate of heating. For example, if 500 grams of water is to be heated from 80° F to 140° F in thirty minutes, the temperature of the water is increased linearly at the rate of two degrees per minute, through use of the apparatus according to the invention.

The apparatus is useful especially in development of information, as may be represented on a linear graph, pertaining to a physical or chemical change versus temperature.

Other objects and advantages of the invention will appear from the description of the preferred embodiment, and from the drawing which is referred to in the description.

BRIEF DESCRIPTION OF THE DRAWING

The drawing is an electrical circuit diagram showing a preferred embodiment of the invention.

DESCRIPTION OF THE PREFERRED EMBODIMENT

Referring now to the drawing in detail, the conductors 10, 11 to transformer 12 are connected to a 115 volt alternating current (AC) electrical power source. The transformer output is connected by conductors 15, 16 to terminals 17, 18, respectively, of bridge rectifier 20. Conductors 21, 22 lead from terminals 23, 24, respectively. Connected in parallel between conductors 21, 22 are capacitor 27, zener diode 28, and variable potentiometer 34. Capacitor 27 smooths out the sawtooth form of the output voltage of bridge rectifier 20 and zener diode 28 regulates the output to constant voltage.

Conductor 22 has resistance 31 between capacitor 27 and diode 28, and resistance 32 between diode 28 and variable potentiometer 34. Variable potentiometer 29 is connected between conductor 11 and the movable contact of potentiometer 34.

Conductors 42, 43 connect plug prongs 44, 45, respectively, to opposite sides of thermocouple 47, conductor 42 having series resistance 48. Conductor 51 having series resistance 52 connects the movable tap of variable potentiometer 29 to conductor 42 between plug prong 44 and resistance 48, and conductor 54 connects from terminal 38 to the other side of resistance 48.

Plug 44, 45 is connected to a proportional controller (not shown) which is set to the maximum temperature to which a liquid slurry, oven, or the like, is to be heated by a heater 55. The heater is connected to the proportional controller by conductors 56, 57. Thermocouple 47 and heater 55 are disposed in the substance or space to be heated, represented by dashed line 58.

A clock motor 60 is connected to the 115 volt alternating current power source by conductors 61, 62. Clock motor 60 moves the variable contact of potentiometer 34 during the timed heating period, to linearly reduce the applied voltage delivered to the controller input from the thermocouple output voltage corresponding to the ultimate maximum temperature to which the substance or space is to be heated, to zero voltage at the end of the timed heating period.

Upon commencement of heating of a liquid or slurry by heater 55, the thermocouple output voltage is usually near zero because the thermocouple tip and the junction at the controller are at approximately the same temperature. As the temperature of the substance or space to be heated rises toward the ultimate maximum heating temperature, the thermocouple output voltage increases approximately linearly until at the end of the heating period all of the control voltage supplied to the controller is supplied by the thermocouple output, and no voltage is supplied by the exterior circuit.

At the commencement of heating, the initial resistance of potentiometer 34 is adjusted to a proportional resistance corresponding to the length of the heating period. Potentiometer 29 is adjusted to zero resistance. The proportional controller is set at the maximum heating temperature desired, most proportional controllers having a calibrated scale for this purpose. After the ON-OFF switch of the controller is turned ON, the center zero meter of the controller will indicate the temperature above the control point, and this is compensated for by adjusting potentiometer 29 (after potentiometer 34 has already been set to the desired heating time) until the center zero meter reads "zero". The clock motor thereafter, during the timed heating period, linearly increases the potentiometer 34 resistance to maximum, so that the voltage applied to the controller by the external circuit is linearly reduced to zero. The controller then receives control voltage only from the thermocouple.

Instead of a thermocouple, the temperature sensing device may be a thermistor, a resistance thermometer, or the like.

While a preferred embodiment of the invention has been described and shown in the drawing, many modifications thereof may be made by a person skilled in the art without departing from the spirit of the invention, and it is intended to protect by Letters Patent all forms of the invention falling within the scope of the following claims.

I claim:

1. Heat control apparatus for use with an electric heater, comprising proportional controller means for supplying heating current to he electric heater, temperature sensing means connected to the controller having a voltage input to said controller proportional to the temperature sensed, external circuit means connected to said temperature sensing means for applying variable voltage to the controller through said temperature sensing means, said controller receiving the sum of input voltage from both said temperature sensing means and said external circuit means, the electric heater being operated by said controller in response to the sum of the input voltages from said temperature sensing means and said external circuit means.

2. Heat control apparatus, comprising electric heater means, proportional controller means for controlling said heater means, temperature sensing means exposed to the temperature of whatever is heated by said heater means having a voltage output propottional to the temperature sensed, said temperature sensing means being connected to said proportional controller for said heater means, electrical circuit means connected to said temperature sensing means for applying voltage to said controller means through said temperature sensing means, said controller means receiving control voltage equal to the sum of the voltage output of said temperature sensing means resulting from heating and said applied voltage, said heater means being operated by said controller means in response to said sum of said voltages.

3. The combination of claim 2, including conductor means connecting said temperature sensing means to said controller means and including resistance means, said electrical circuit means being connected across said resistance means.

4. The combination of claim 3, said electric circuit means comprising means delivering constant direct current voltage, and variable potentiometer means for controlling said applied voltage to said controller means.

5. The combination of claim 4, including clock motor means for controlling said variable potentiometer means to substantially linearly reduce said applied voltage during a timed heating period.

6. The combination of claim 5, said temperature sensing means being a thermocouple.

7. The combination of claim 6, said applied voltage being reduced substantially linearly from a voltage substantially equal to the output voltage of said thermocouple means at the maximum temperature of heating, to zero, during the heating period, the output voltage of said thermocouple increasing substantially linearly from zero to the output voltage of said thermocouple means at said maximum temperature of heating during the heating period, whereby said controller means operates said heater means to supply heat for neating in response to reduction of said applied voltage and the increase in thermocouple means output voltage caused by heating maintaining the voltage supplied to said controller substantially constant.

\* \* \* \* \*